(12) United States Patent
Muramatsu (10) Patent No.: US 8,294,795 B2
(45) Date of Patent: Oct. 23, 2012

(54) IMAGE CAPTURING APPARATUS AND MEDIUM STORING IMAGE PROCESSING PROGRAM

(75) Inventor: Masaru Muramatsu, Kawasaki (JP)

(73) Assignee: Nikon Corporation, Tokyo (JP)

( * ) Notice: Subject to any disclaimer, the term of this patent is extended or adjusted under 35 U.S.C. 154(b) by 404 days.

(21) Appl. No.: 12/719,082

(22) Filed: Mar. 8, 2010

(65) Prior Publication Data
US 2010/0245622 A1 Sep. 30, 2010

(30) Foreign Application Priority Data
Mar. 25, 2009 (JP) ................................ 2009-074829

(51) Int. Cl.
*H04N 5/202* (2006.01)
(52) U.S. Cl. ........................................................ 348/254
(58) Field of Classification Search .................... 348/254
See application file for complete search history.

(56) References Cited

U.S. PATENT DOCUMENTS
6,965,406 B1 * 11/2005 Ueda et al. .................... 348/252
2007/0070214 A1 3/2007 Nakamura
2009/0179999 A1 * 7/2009 Albu et al. .................. 348/222.1
2010/0026833 A1 * 2/2010 Ciuc et al. .................. 348/222.1

FOREIGN PATENT DOCUMENTS
JP A-2007-124604 5/2007

* cited by examiner

*Primary Examiner* — Anthony J Daniels
(74) *Attorney, Agent, or Firm* — Oliff & Berridge, PLC (57) ABSTRACT

An image capturing apparatus includes an image capturing unit, a generating unit, a detecting unit, and a calculating unit. The image capturing unit captures an image of a subject to generate image data. The generating unit generates a blurred image from the image data. The detecting unit detects a main subject area included in the image data. The calculating unit calculates an evaluation value regarding a brightness based on an image of the main subject area among the blurred image, and calculates an improvement amount of lightness used for performing a correction on dark part gradation of the image data generated by the image capturing unit based on the evaluation value being calculated. Therefore, it is possible to adjust the exposure and correct the dark part gradation optimally both for a main subject portion and a background portion.

12 Claims, 8 Drawing Sheets

IMAGE CAPTURING APPARATUS AND MEDIUM STORING IMAGE PROCESSING PROGRAM

CROSS REFERENCE TO RELATED APPLICATION

This application is based upon and claims the benefit of priority from Japanese Patent Application No. 2009-074829, filed on Mar. 25, 2009, the entire contents of which are incorporated herein by reference.

BACKGROUND

1. Field

The present application relates to an image capturing apparatus and a storage medium in which an image processing program is recorded.

2. Description of the Related Art

Conventionally, there has been contrived various arts relating to exposure adjustment of an image capturing apparatus. For example, an invention of Japanese Unexamined Patent Application Publication No. 2007-124604 converts a tone characteristic so as to increase luminance of a face area included in a subject according to the result of face detection, thereby performing exposure adjustment for emphasizing a face area.

However, in the invention of Japanese Unexamined Patent Application Publication No. 2007-124604, since the luminance of the face area is increased in the conversion of the tone characteristic, contract on a highlight side lowers. That is, emphasizing the face area sometimes results in a problem in a background portion.

SUMMARY

Therefore, it is a proposition of the present embodiment to adjust the exposure and correct dark part gradation optimally both for a main subject portion and a background portion.

An image capturing apparatus according to an aspect of embodiment includes an image capturing unit capturing an image of a subject to generate image data; a generating unit generating a blurred image from the image data; a detecting unit detecting a main subject area included in the image data; and a calculating unit calculating an evaluation value regarding a brightness based on an image of the main subject area among the blurred image, and calculating an improvement amount of lightness used for performing a correction on dark part gradation of the image data generated by the image capturing unit based on the evaluation value being calculated.

The image capturing apparatus according to the above aspect may further include a photometry unit performing a photometry by dividing the subject into a plurality of areas; a first photometric calculating unit calculating a first exposure control value based on a result of the photometry by the photometry unit; and a second photometric calculating unit calculating a second exposure control value different from the first exposure control value based on the result of the photometry by the photometry unit, and in which the image capturing unit may capture the image of the subject according to the second exposure control value when performing the correction on the dark part gradation; and the calculating unit may calculate the improvement amount of lightness based on the evaluation value and the second exposure control value.

In the image capturing apparatus of the above aspect, the second photometric calculating unit may compares the first exposure control value and a maximum value of photometric values in the plurality of areas, and corrects the first exposure control value and calculate the second exposure control value according to a result of the comparison.

The image capturing apparatus according to the above aspect may further include an editing unit editing each frame forming the moving image according to the control value calculated by the calculating unit.

The image capturing apparatus according to the above aspect may further include a mode selecting unit selecting a shooting mode from a plurality of predetermined shooting modes, and in which the second photometric calculating unit may calculate the second exposure control value corresponding to a kind of the shooting mode selected by the mode selecting unit.

The image capturing apparatus according to the above aspect may further include a setting unit setting a photographic sensitivity during the capturing of the image by the image capturing unit, and in which the second photometric calculating unit may calculate the second exposure control value corresponding to the photographic sensitivity set by the setting unit.

In the image capturing apparatus according to the above aspect, the detecting unit may detect a face area of a person included in the image data as the main subject area.

In the image capturing apparatus according to the above aspect, the detecting unit may detect a plurality of the face areas, and the calculating unit may calculate the evaluation value based on an image having a largest face area among the plurality of the face areas.

In the image capturing apparatus according to the above aspect, the detecting unit may detect a plurality of the face areas and the calculating unit may calculate the evaluation value based on an image having a darkest face area among the plurality of the face areas.

In the image capturing apparatus according to the above aspect, the detecting unit may detect a plurality of the face areas and the calculating unit may calculate the evaluation value for each of the plurality of the face areas, and calculate the improvement amount of lightness based on a result of a weighted addition of the evaluation value being calculated for each of the plurality of the face areas.

The image capturing apparatus according to the above aspect may further include a correcting unit performing the correction to improve a lightness of the dark part gradation of the image data generated by the image capturing unit according to the improvement amount of lightness calculated by the calculating unit; and a recording unit recording the image data corrected by the correcting unit.

In the image capturing apparatus according to the above aspect, the correcting unit may perform the correction on the dark part gradation by using the blurred image generated by the generating unit.

The image capturing apparatus according to the above aspect may further include a mode selecting unit selecting a shooting mode from a plurality of predetermined shooting modes; and a controlling unit selecting whether or not to calculate the improvement amount of lightness by the calculating unit and to perform the correction by the correcting unit according to a kind of the shooting mode selected by the mode selecting unit.

Further, a storage medium which stores an image processing program that executes image processing to image data being a processing target and that corresponds to any of the above-described structures of the image capturing apparatus is also effective as a concrete aspect of the present application.

DETAILED DESCRIPTION OF THE EMBODIMENT

Hereinafter, an embodiment of the present invention will be described by using the drawings. In the embodiment, an electronic camera of single lens reflex type will be described as an example of an image capturing apparatus of the present invention.

Figure 1:
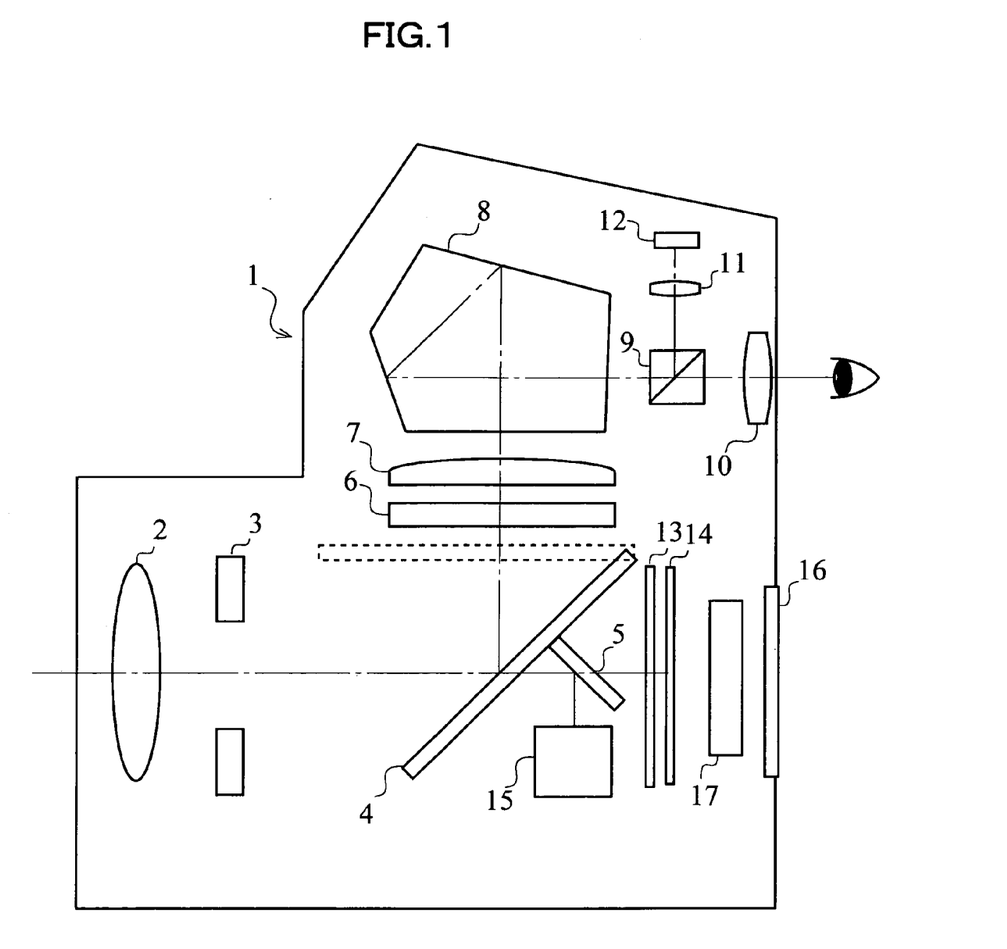
FIG. 1 is a view showing the structure of an electronic camera 1 of the embodiment.

FIG. 1 is a view showing the structure of an electronic camera 1 of this embodiment. As shown in FIG. 1, the electronic camera 1 includes a photographic lens 2, an aperture diaphragm 3, a quick return mirror 4, a sub mirror 5, a diffusing screen 6, a condenser lens 7, a pentaprism 8, a beam splitter 9, an eyepiece lens 10, an imaging lens 11, a photometry sensor 12, a shutter 13, an image-capturing sensor 14, and a focus detecting part 15.

Figure 2A:
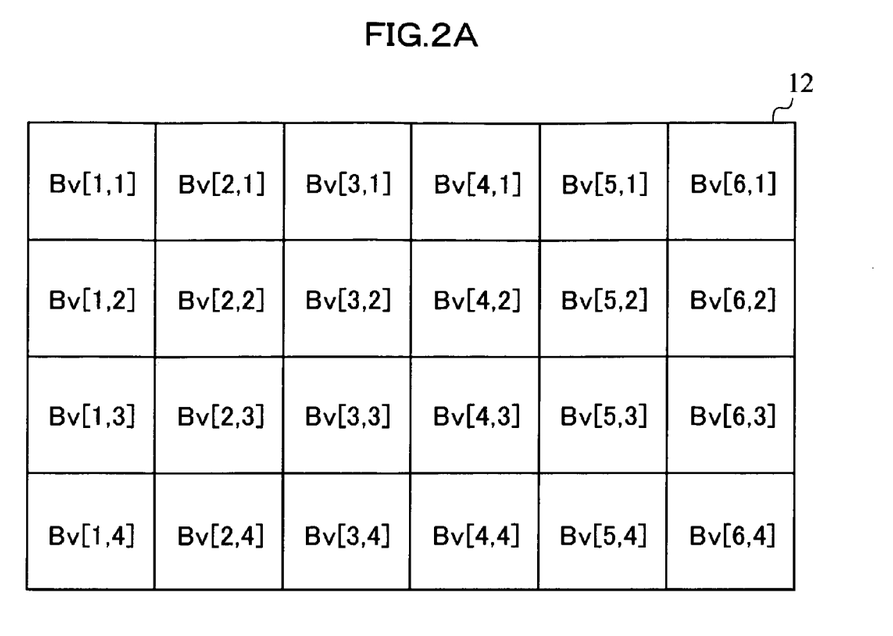
FIG. 2A is a view to explain a photometry sensor 12.

The photometry sensor 12 is a 24-split photometry sensor shown in FIG. 2A. Regarding the photometry using the photometry sensor 24, the photometry sensor 12 has a plurality of photometry modes such as "a split photometry mode", "a center-weighted photometry mode", "a spot photometry mode", and so on, and selectively executes one of the photometry modes. Further, the image-capturing sensor 14 is a semiconductor device such as, for example, a CCD (Charged Coupled Device) or a CMOS (Complementary Metal Oxide Semiconductor). The focus detecting part 15 detects a focus state of the photographic lens 2 by, for example, detecting a focus by a phase difference method.

The electronic camera 1 further includes: a monitor 16 such as a liquid crystal monitor displaying an image and so on generated by the image capturing; and a controlling unit 17 controlling the above parts. The controlling unit 17 includes a not-shown internal memory, in which programs for controlling the respective parts are recorded in advance.

At the non-shooting time, that is, when the shooting is not performed, the quick return mirror 4 is set at a 45° angle as shown in FIG. 1. A bundle of rays having passed through the photographic lens 2 and the aperture diaphragm 3 is reflected by the quick return mirror 4 and is led to the eyepiece lens 10 via the diffusing screen 6, the condenser lens 7, the pentaprism 8, and the beam splitter 9. A user confirms the picture composition by visually observing an image of a subject via the eyepiece lens 10. Meanwhile, the bundle of rays split upward by the beam splitter 9 is re-imaged on an imaging area of the photometry sensor 12 via the imaging lens 11. Further, the bundle of rays transmitted by the quick return mirror 4 is led to the focus detecting part 15 via the sub mirror 5. At the time of shooting, the quick return mirror 4 retreats to a position shown by the broken line to open the shutter 13, and the bundle of rays from the photographic lens 2 is led to the image-capturing sensor 14.

Figure 3:
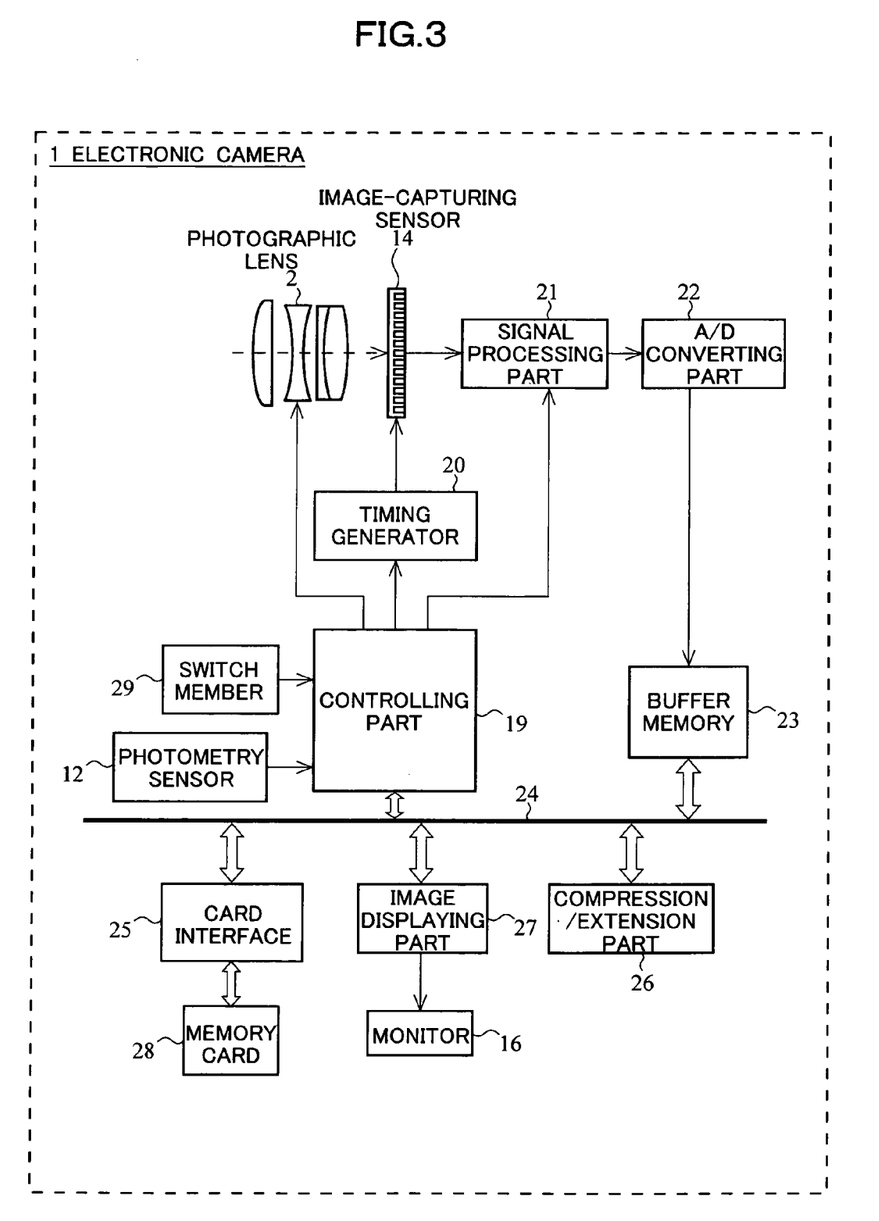
FIG. 3 is a functional block diagram of the electronic camera 1 of the embodiment.

FIG. 3 is a functional block diagram of the electronic camera 1 of the embodiment. As shown in FIG. 3, the electronic camera 1 includes, in addition to the structure in FIG. 1, a timing generator 20, a signal processing part 21, an A/D converting part 22, a buffer memory 23, a bus 24, a card interface 25, a compression/extension part 26, and an image displaying part 27. The timing generator 20 supplies an output pulse to the image-capturing sensor 14. Further, image data generated by the image-capturing sensor 14 is temporarily stored in the buffer memory 23 via the signal processing part 21 (including a gain adjusting part corresponding to photographic sensitivity) and the A/D converting part 22. The buffer memory 23 is coupled to the bus 24. The card interface 25, the controlling unit 17 described in FIG. 1, the compression/extension part 26, and the image displaying part 27 are coupled to the bus 24. The card interface 25 is coupled to a memory card 28 attachable/detachable thereto/therefrom to record the image data in the memory card 28. Further, a switch member 29 (including a release button and so on not shown) of the electronic camera 1, the timing generator 20, and the photometry sensor 12 are coupled to the controlling unit 17. Further, the image displaying part 27 displays an image and so forth on the monitor 16 provided on a rear surface of the electronic camera 1.

The electronic camera 1 further includes a plurality of predetermined shooting modes. The plural shooting modes include, for example, a multi-program auto mode (P mode) where a shutter speed and an aperture value are automatically decided, a shutter priority auto mode (S mode) where a user can designate the shutter speed, an aperture priority auto mode (A mode) where a user can designate the aperture value, a manual mode, a full auto mode, a portrait shooting mode (portrait mode or the like), and other modes (landscape mode, close-up mode, night-landscape mode, and so on). Any of these shooting modes is selected in advance by a user via the switch member 29.

The electronic camera 1 further includes a tone non-compression mode where dark part gradation of image data is not corrected and a gradation compression mode where the dark part gradation is corrected. Which of the modes is used for the shooting may be selected in advance by a user via the switch member 29 or may be automatically selected by the controlling unit 17. The controlling unit 17 performs the automatic selection according to a kind of the shooting mode, the result of subject recognition, and the like.

The operation of the electronic camera 1 having the above-described structure at the time of the shooting will be described by using the flowcharts shown in FIG. 4 and FIG. 5.

At Step S1, the controlling unit 17 performs photometric calculation according to the photometry results by the photometry sensor 12. The photometric calculation will be described by using the flowchart shown in FIG. 5.

At Step S11, the controlling unit 17 obtains the results of 24-split photometry from the photometry sensor 12. The photometry sensor 12 photoelectrically converts incident light, and outputs 24-split luminance values Bv[1, 1] to Bv[6, 4] corresponding to the respective divided areas as shown in FIG. 2A.

Figure 2B:
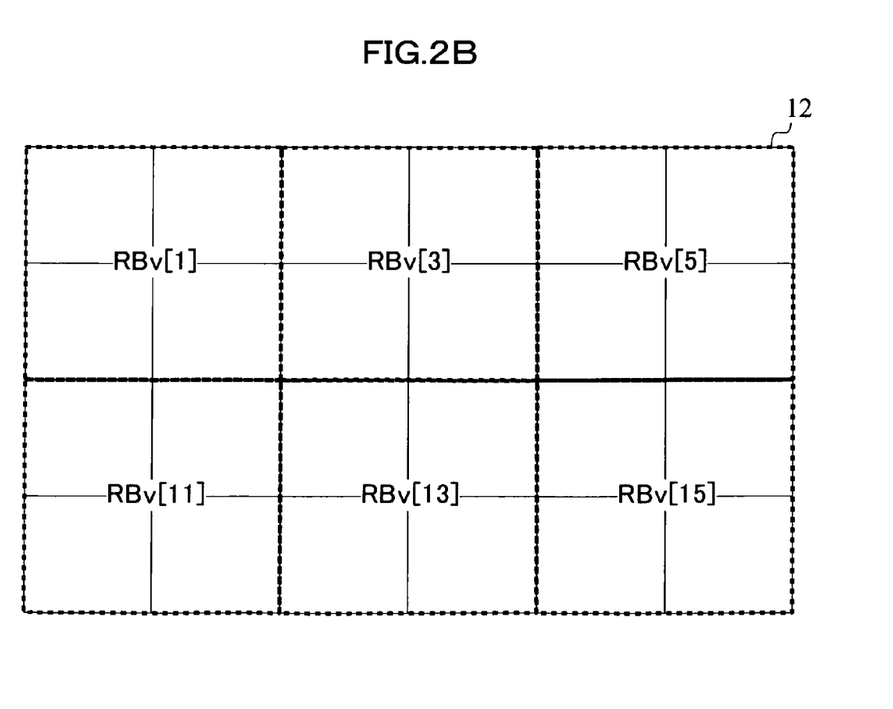
FIG. 2B is a view to explain the photometry sensor 12.

At Step S12, the controlling unit 17 obtains the results of 15-split photometry based on the results of the 24-split photometry obtained at Step S11. The controlling units 17 combines the 24-split luminance values Bv[1, 1] to Bv[6, 4] obtained at Step S11 in a unit of four values, and obtains 15-split luminance values RBv[1] to RBv[15]. The 15-split luminance values RBv[1] to RBv[15] are calculated by the following expression 1 to expression 15. Further, FIG. 2B shows an example of some (RBv[1], RBv[3], RBv[5], RBv[11], RBv[13], RBv[15]) of the 15-divided areas.

$$RBv[1]=(Bv[1,1]+Bv[2,1]+Bv[1,2]+Bv[2,2])/4 \quad \text{(expression 1)}$$

$$RBv[2]=(Bv[2,1]+Bv[3,1]+Bv[2,2]+Bv[3,2])/4 \quad \text{(expression 2)}$$

$$RBv[3]=(Bv[3,1]+Bv[4,1]+Bv[3,2]+Bv[4,2])/4 \quad \text{(expression 3)}$$

$$RBv[4]=(Bv[4,1]+Bv[5,1]+Bv[4,2]+Bv[5,2])/4 \quad \text{(expression 4)}$$

$$RBv[5]=(Bv[5,1]+Bv[6,1]+Bv[5,2]+Bv[6,2])/4 \quad \text{(expression 5)}$$

$$RBv[6]=(Bv[1,2]+Bv[2,2]+Bv[1,3]+Bv[2,3])/4 \quad \text{(expression 6)}$$

$$RBv[7]=(Bv[2,2]+Bv[3,2]+Bv[2,3]+Bv[3,3])/4 \quad \text{(expression 7)}$$

$$RBv[8]=(Bv[3,2]+Bv[4,2]+Bv[3,3]+Bv[4,3])/4 \quad \text{(expression 8)}$$

$$RBv[9]=(Bv[4,2]+Bv[5,2]+Bv[4,3]+Bv[5,3])/4 \quad \text{(expression 9)}$$

$$RBv[10]=(Bv[5,2]+Bv[6,2]+Bv[53]+Bv[6,3])/4 \quad \text{(expression 10)}$$

$$RBv[11]=(Bv[1,3]+Bv[2,3]+Bv[1,4]+Bv[2,4])/4 \quad \text{(expression 11)}$$

$$RBv[12]=(Bv[2,3]+Bv[3,3]+Bv[2,4]+Bv[3,4])/4 \quad \text{(expression 12)}$$

$$RBv[13]=(Bv[3,3]+Bv[4,3]+Bv[3,4]+Bv[4,4])/4 \quad \text{(expression 13)}$$

$$RBv[14]=(Bv[4,3]+Bv[5,3]+Bv[4,4]+Bv[5,4])/4 \quad \text{(expression 14)}$$

$$RBv[15]=(Bv[5,3]+Bv[6,3]+Bv[5,4]+Bv[6,4])/4 \quad \text{(expression 15)}$$

At Step S13, based on the photometry results obtained at Step S11 and Step S12, the controlling unit 17 calculates, as feature quantities, a mean luminance value BvMean, a maximum luminance value BvMax15 and a minimum luminance value BvMin15 of the 15-split luminance values RBv, a center luminance value BvC, and a maximum luminance value BvMax24 of the 24-split luminance values. These values are calculated by the following expressions.

$$BvMean = \left(\sum_{i=1}^{15} RBv[i]\right) / 15 \quad \text{(expression 16)}$$

$$BvMax15 = MAX(RBv[1] \text{ to } RBv[15]) \quad \text{(expression 17)}$$

$$BvMin15 = MIN(RBv[1] \text{ to } RBv[15]) \quad \text{(expression 18)}$$

$$BvC = RBv[8] \quad \text{(expression 19)}$$

$$BvMax24 = MAX(Bv[1,1] \text{ to } Bv[6,4]) \quad \text{(expression 20)}$$

At Step S14, based on the values calculated at Step S13, the controlling unit 17 calculates an exposure control value BvContl0. The exposure control value BvContl0 is calculated by the following expression.

$$BvContl0 = k1 \cdot BvMean + k2 \cdot BvMax15 + k3 \cdot BvMin15 + k4 \cdot BvC + k5 \quad \text{(expression 21)}$$

In the expression 21, k1 to k4 are coefficients representing weights in the respective terms. Further, k5 is a constant term. k1 to k5 are the numbers dependent on the average luminance value BvMean and are decided in advance so as to yield a better image in various sample scenes. Examples of k1 to k5 are shown in the following Table 1.

TABLE 1

|  | k1 | k2 | k3 | k4 | k5 |
|---|---|---|---|---|---|
| BvMean ≦ Bv4 | 0.4 | 0.1 | 0.2 | 0.3 | 0.3 |
| Bv4 < BvMean | 0.2 | 0.2 | 0.3 | 0.3 | −0.3 |

At Step S15, the controlling unit 17 compares the exposure control value BvContl0 calculated at Step S14 and the maximum luminance value BvMax24 of the 24-split luminance values Bv. The controlling unit 17 calculates a value dHi by which a difference between the exposure control value BvContl0 and the maximum luminance value BvMax24 of the 24-split luminance values Bv is larger than a predetermined value thHi, by using the following expression.

$$dHi = BvMax24 - BvContl0 - thHi \quad \text{(expression 22)}$$

In the expression 22, the predetermined value thHi is an amount that is expected to cause saturation of a highlight portion of the image, and is about 2Ev to 3Ev, for instance. This predetermined value thHi is set to an optimum value according to saturation level of the image-capturing sensor 14 being an imaging sensor, size of pixels of the photometry sensor 12, or the like.

At Step S16, the controlling unit 17 calculates a highlight recovery amount HiRcv based on the comparison result at Step S15. The controlling unit 17 calculates the highlight recovery amount HiRcv by using the following expression.

$$HiRcv = \begin{cases} 0 & dHi < 0 \\ dHi & 0 \leq dHi \leq thdHi \\ thdHi & thdHi < dHi \end{cases} \quad \text{(expression 23)}$$

As shown in the expression 23, the controlling unit 17 clips the value dHi, calculated at Step S15, by which the difference between the exposure control value BvContl0 and the maximum luminance value BvMax24 of the 24-split luminance values Bv is larger than the predetermined value thHi, between 0 and a threshold value thdHi to set the highlight recovery amount HiRcv.

In the expression 23, the threshold value thdHi is a predetermined threshold value representing an amount with which the highlight recovery is possible, the amount being dependent on size of a dynamic range of the image-capturing sensor 14 being an imaging sensor. The controlling unit 17 changes the threshold value thdHi according to the shooting mode and ISO sensitivity.

The controlling unit 17 finds the threshold value thdHi dependent on the shooting mode based on Table 2 and at the same time finds the threshold value thdHi dependent on the ISO sensitivity based on Table 3. Then, a larger threshold value thdHi is used for the calculation of the aforesaid highlight recovery amount HiRcv.

TABLE 2

| SHOOTING MODE | thdHi |
|---|---|
| P, S, A MODES | 1.5 |
| FULL AUTO MODE | 1.0 |
| PORTRAIT SHOOTING MODE | 0.0 |
| OTHER MODES | 1.5 |

TABLE 3

| ISO | thdHi |
| --- | --- |
| 100 to 200 | 1.5 |
| 201 to 400 | 1.0 |

When the portrait shooting mode where the main subject can be expected to be a person is set, it is necessary to prevent a photographed face portion of the person from being unnecessarily dark. Therefore, when the portrait shooting mode is set, the threshold value thdHi is set small as shown in Table 2.

Further, when the ISO sensitivity of the image-capturing sensor 14 is set high, there is a risk that noise increases and the dynamic range is lacking. Therefore, when the ISO sensitivity of the image-capturing sensor 14 is set high, the threshold value thdHi is set small as shown in Table 3.

Alternative structure may be to detect an amount of noise generation that is expected to occur at the time of the shooting, and according to the detection result, provide an upper limit to the highlight recovery amount HiRcv or decrease the aforesaid threshold value thdHi.

At Step S17, the controlling unit 17 corrects the exposure control value BvContl0 calculated at Step S14, based on the highlight recovery amount HiRcv calculated at Step S16. The exposure control value BvContl0 is corrected by the following expression.

exposure control value $Bv$Cnt11 after the
correction=$Bv$Cnt10+$HiRcv$ (expression 24)

However, when the photometry mode is "the center-weighted photometry mode" or "the spot photometry mode" except "the split photometry mode", a regular exposure control value is adopted, and as the highlight recovery amount HiRcv, a fixed value HiRcvConst is used.

Figure 4:
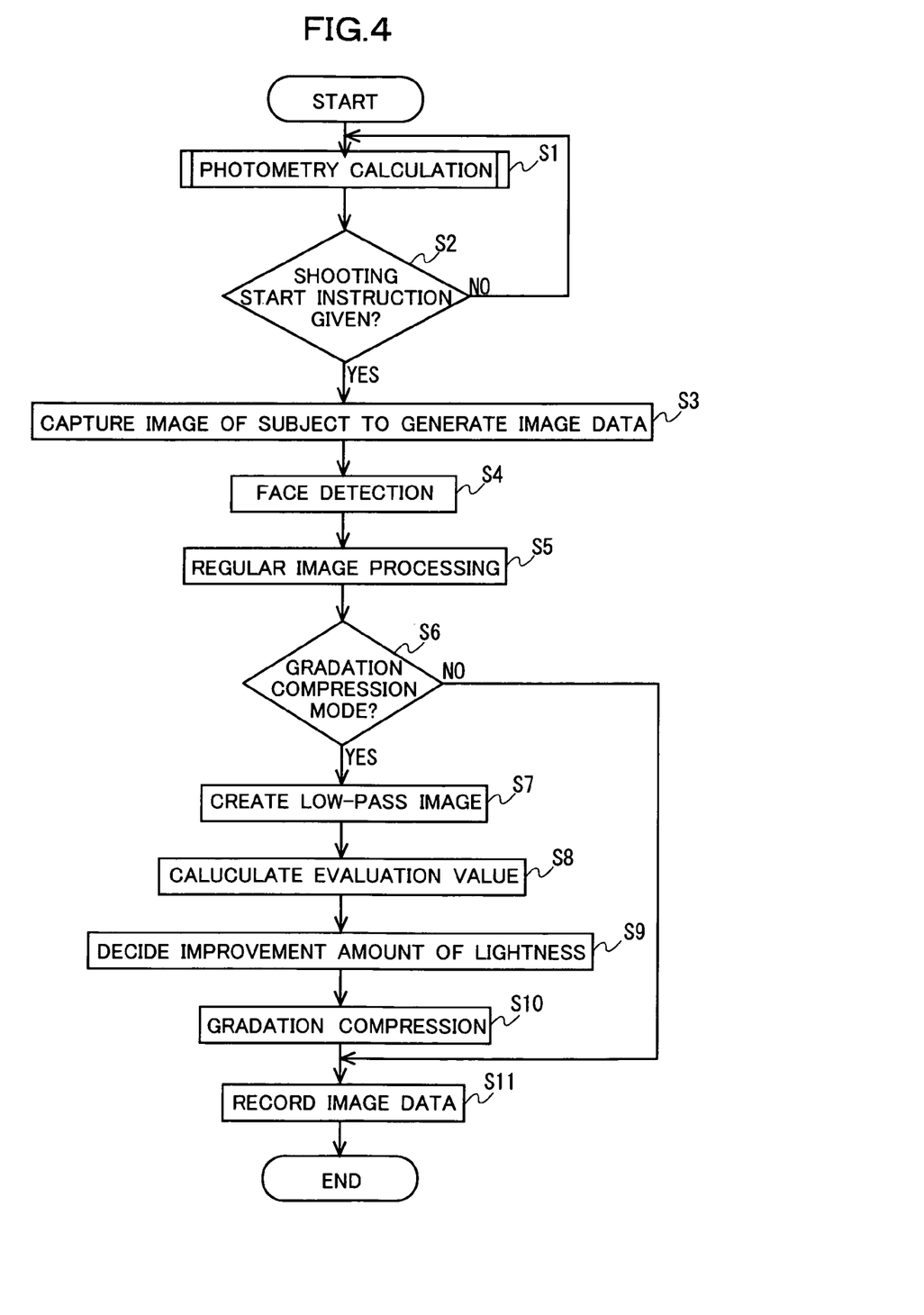
FIG. 4 is a flowchart showing the operation of the electronic camera 1 of the embodiment at the time of shooting.
Figure 5:
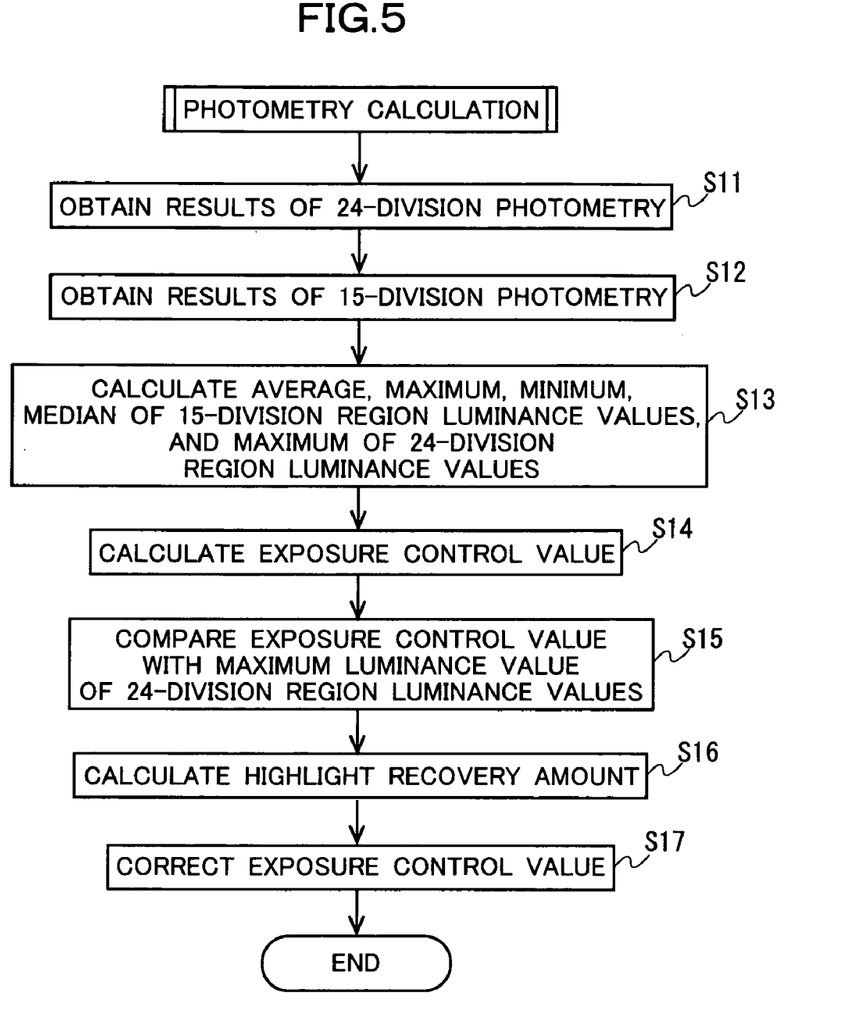
FIG. 5 is a flowchart showing the operation of the electronic camera 1 of the embodiment at the time of the shooting.

After the above-described photometry calculation, the controlling unit 17 proceeds to Step S2 in FIG. 4.

At Step S2, the controlling unit 17 determines whether or not a user has given a shooting start instruction via the switch member 29. Then, the controlling unit 17 repeats the photometry calculation described at Step S1 until determining that the shooting start instruction has been given, and proceeds to Step S3 when determining that the shooting start instruction has been given.

At Step S3, the controlling unit 17 controls the parts, and based on the result of the photometry calculation at Step S1, causes the image-capturing sensor 14 to capture an image of the subject and generate image data. Then, the image data generated by the image-capturing sensor 14 is temporarily stored in the buffer memory 23 via the signal processing part 21 and the A/D converting part 22.

Figure 6:
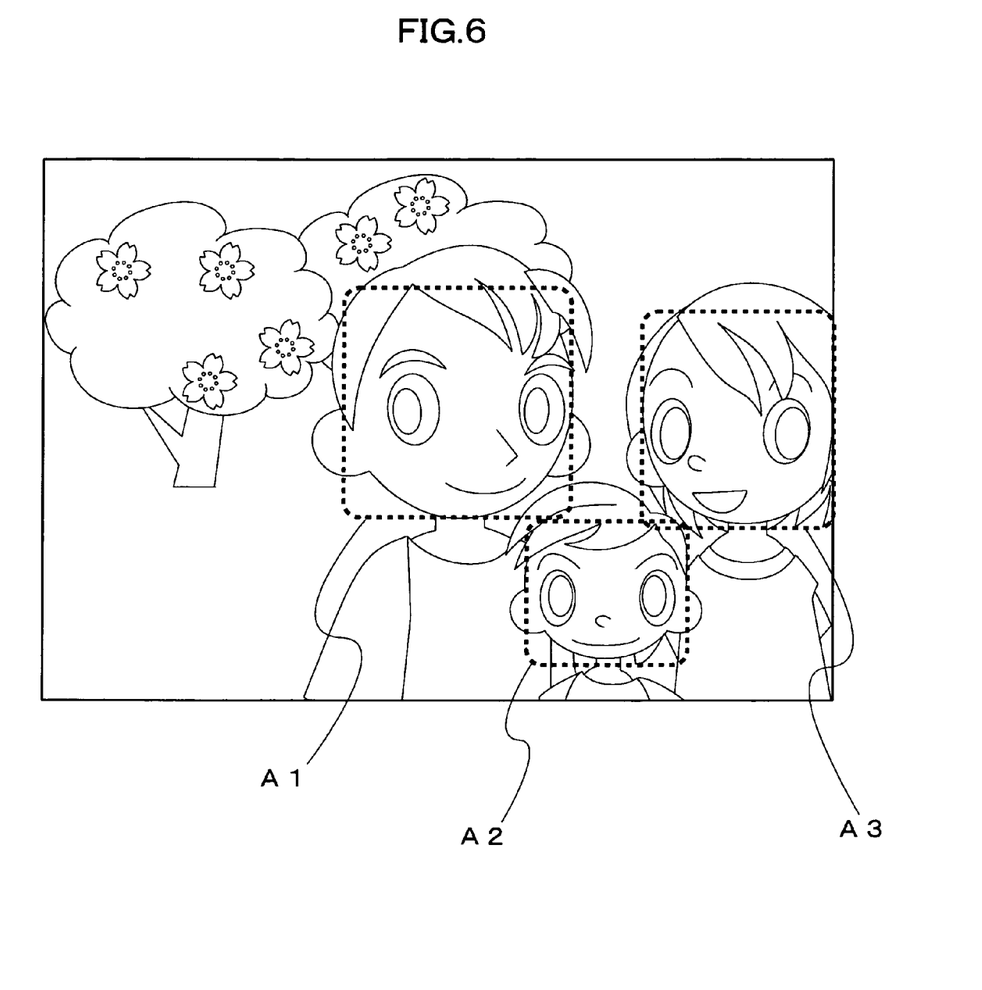
FIG. 6 is a view to explain the detection of face areas.

At Step S4, the controlling unit 17 reads the image data from the buffer memory 23 to perform face detection. A concrete method of the face detection is the same as that of a publicly known art and therefore description thereof will be skipped. Incidentally, when the image data as a detection target includes a plurality of persons, the controlling unit 17 detects faces of the respective persons. For example, when three persons are included as shown in FIG. 6, face areas (A1 to A3) of the respective persons are detected.

At Step S5, the controlling unit 17 applies regular image processing to the image data read from the buffer memory 23 at Step S4. The regular image processing refers to white balance adjustment, an interpolation process, a color correction process, a tone conversion process, and so on. Concrete methods of the processes are the same as those of a publicly known art and therefore description thereof will be skipped.

At Step S6, the controlling unit 17 determines whether or not a current mode is the gradation compression mode. Then, when determining that the current mode is the gradation compression mode, the controlling unit 17 proceeds to Step S7. On the other hand, when determining that the current mode is not the gradation compression mode (is the tone non-compression mode), the controlling unit 17 proceeds to Step S11 which will be described later.

At Step S7, the controlling unit 17 creates a low-pass image from the image data read from the buffer memory 23 at Step S4.

The controlling unit 17 uses the following expression for creating the low-pass image Ly from the image data read from the buffer memory 23 at Step S4.

$$Y[x, y] = kr \cdot R[x, y] + kg \cdot G[x, y] + kb \cdot B[x, y] \quad \text{(expression 25)}$$

$$Ly[x, y] = \sum_{i=-d}^{d} \sum_{j=-d}^{d} \left( Y[x+i, y+j] \cdot Lpw\left((i^2 + j^2)^{1/2}\right) \right) \quad \text{(expression 26)}$$

Figure 7:
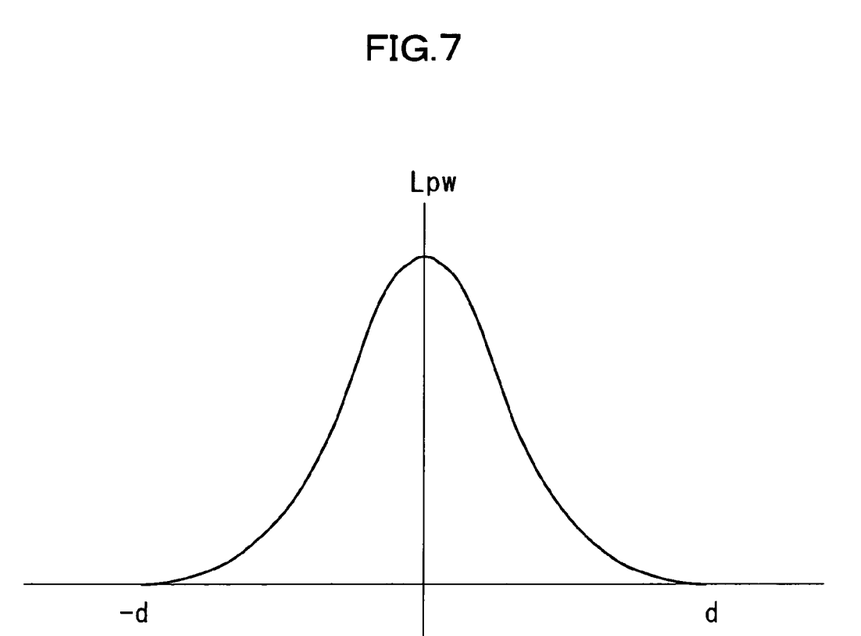
FIG. 7 is a chart showing a characteristic of a low-pass filter.

Y in the expression 25 represents a luminance value of a pixel of interest. Further, kr, kg, and kb in the expression 25 are predetermined coefficients. Further, Lpw in the expression 26 is a low-pass filter around the pixel of interest and this low-pass filter has a characteristic shown in FIG. 7. This low-pass filter is a wide low-pass filter whose half breadth (d in FIG. 7) is equal to or more than 1/100 of a short side of an image.

At Step S8, the controlling unit 17 calculates an evaluation value regarding brightness. The controlling unit 17 first finds center coordinates (Fx, Fy) of the face area based on the result of the face detection performed at Step S4. However, when the plural faces are detected at Step S4, the center coordinates of the face area with the largest area are found. In the example in FIG. 6, the center coordinates of the face area A1 are found.

Next, the controlling unit 17 calculates lightness Yf of the face as the evaluation value regarding brightness. The lightness Yf of the face is calculated by the following expression.

$$Yf = Ly[Fx, Fy] \quad \text{(expression 27)}$$

Incidentally, the example where the center coordinates of the face area with the largest area are found when the plural faces are detected at Step S4 is shown, but the center coordinates of the darkest face area may be found. By thus performing the process according to the darkest face area, it is possible to express all the plural faces with favorable brightness.

Another alternative may be to calculate the lightness Yf of each of the plural faces and weigh the calculated values according to the areas of the face areas. For example, in the example in FIG. 6, when the center coordinates of the face area A1 are (Fx1, Fy1) and its area is W1, the center coordinates of the face area A2 are (Fx2, Fy2) and its area is W2, and the center coordinates of the face area A3 are (Fx3, Fy3) and its area is W3, the lightness Yf of the faces can be calculated by the following expression.

$$Yf = (W1 \cdot Ly[Fx1, Fy1] + W2 \cdot Ly[Fx2, Fy2] + W3 \cdot Ly[Fx3, Fy3]) \div (W1 + W2 + W3) \quad \text{(expression 28)}$$

At Step S9, the controlling unit 17 decides an improvement amount of lightness used for correcting dark part gradation. Based on Table 4, the controlling unit 17 first finds an improvement amount of lightness candidate fup dependent on the lightness Yf of the face calculated at Step S8.

TABLE 4

| Yf | fup |
|---|---|
| 0 to 60 | 3 |
| 61 to 120 | 2 |
| 121 to 150 | 1 |
| 151 to 255 | 0 |

However, the controlling unit 17 limits the improvement amount of lightness candidate fup according to the ISO sensitivity used for the image capturing performed at Step S3. That is, the controlling unit 17 limits the improvement amount of lightness candidate fup based on Table 5.

TABLE 5

| ISO | fup(maximum) |
|---|---|
| 100 to 200 | 3 |
| 201 to 400 | 2 |
| more than or equal to 401 | 1 |

Next, the controlling unit 17 finds an improvement amount of lightness candidate Hup dependent on the highlight recovery amount HiRcv calculated at Step S16, based on Table 6.

TABLE 6

| HiRcv | Hup |
|---|---|
| more than or equal to 1.01 | 3 |
| 0.51 to 1.00 | 2 |
| 0.01 to 0.50 | 1 |
| 0.0 | 0 |

Then, the controlling unit 17 compares the improvement amount of lightness candidate fup dependent on the lightness Yf of the face and the improvement amount of lightness candidate Hup dependent on the highlight recovery amount HiRcv, and sets a larger value as an improvement amount of lightness Gup dependent on the highlight recovery amount HiRcv.

At Step S10, the controlling unit 17 tone-compresses the image data having undergone the regular image processing at Step S5, according to the improvement amount of lightness Gup decided at Step S9.

Figure 8:
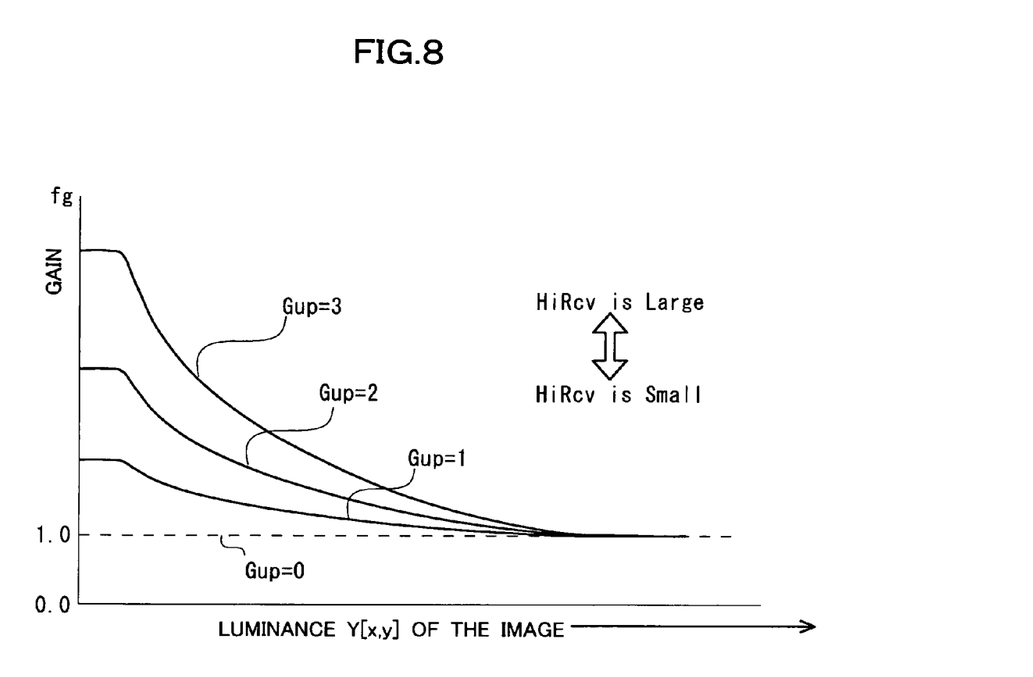
FIG. 8 is a chart showing gain improvement functions fg of gradation compression of the embodiment.

The controlling unit 17 first selects a gain improvement function fg according the improvement amount of lightness Gup decided at Step S9. FIG. 8 is a chart showing the gain improvement functions fg of the gradation compression corresponding to the improvement amounts of lightness Gup. As shown in FIG. 8, the gain improvement function fg has a gain that changes according to the luminance Y of the image. The smaller the luminance Y is (the darker a neighborhood range including a processed pixel is), the larger the gain improvement function fg is. On the contrary, the larger the luminance Y is (the brighter the neighborhood range including the processed pixel is), the closer to 1 the gain improvement function fg is.

The controlling unit 17 selects the gain improvement function fg according to the aforesaid improvement amount of lightness Gup and gains up a shadow area according to lightness in the vicinity of the pixel x, y of interest by a later-described method.

Incidentally, in FIG. 8, the gain improvement functions fg corresponding to the respective improvement amounts of lightness Gup=0, 1, 2, 3 are shown as an example. The plural gain improvement functions fg may be prepared according to the improvement amounts of lightness Gup in advance, or only a gain improvement function with the largest gain-up amount may be prepared to appropriately interpolate between the gain improvement function fg with the largest gain-up amount and a gain 1, thereby adopting a single-step gain improvement function.

Further, when it is determined at Step S6 that the current mode is not the gradation compression mode (the current mode is the tone non-compression mode), if the gradation compression process cannot be skipped because of the structure of a processing circuit in the controlling unit 17, the gain improvement function fg corresponding to Gup=0 in FIG. 8 is used.

The gradation compression calculation at respective pixels R[x, y], G[x, y], B[x, y] is performed by the following expression 29 to expression 31.

$$Rc[x,y]=R[x,y]\cdot fg(Ly[x,y]) \quad \text{(expression 29)}$$

$$Gc[x,y]=G[x,y]\cdot fg(Ly[x,y]) \quad \text{(expression 30)}$$

$$Bc[x,y]=B[x,y]\cdot(Ly[x,y]) \quad \text{(expression 31)}$$

fg in the expression 29 to the expression 31 corresponds to the aforesaid gain improvement function fg, and Ly corresponds to the low-pass image described at Step S7.

At Step S11, the controlling unit 17 records the image data having undergone the gradation compression process at Step S10 or the image data having undergone the regular image processing at Step S5 in the memory card 28 via the card interface 25, and finishes a series of the processes. Incidentally, before the image data is recorded in the memory card 28, an image compression process (such as a JPEG compression process or the like) may be applied to the image data via the compression/extension part 26 as necessary.

As described above, according to this embodiment, there are included an image capturing unit capturing an image of a subject to generate image data; a generating unit generating a blurred image; and a detecting unit detecting a main subject area included in the image data, and an evaluation value regarding brightness is calculated based on an image of the main subject area in the blurred image, and based on the calculated evaluation value, an improvement amount of lightness used for correcting dark part gradation of the image data generated by the image capturing unit is calculated.

Therefore, it is possible to prevent the occurrence of an adverse-effect on a background portion, which occurs in the brightness adjustment by simple conversion of a tone characteristic. Further, the improvement amount of lightness used for correcting the dark part gradation is calculated based on the evaluation value regarding the main subject area, and therefore, by correcting the tone of the shadow portion according to this improvement amount, it is possible to improve lightness of the main subject area while maintaining the contrast of a highlight side and a shadow side. Therefore, it is possible to correct the dark part gradation optimally both for the main subject portion and the background portion, and accordingly, by photographing, it is possible to generate an image close to an image seen by a user's eye.

Further, according to this embodiment, there are further included a photometry unit performing photometry by dividing the subject into a plurality of areas; a first photometric calculating unit calculating a first exposure control value based on a result of the photometry by the photometry unit; and a second photometric calculating unit calculating a second exposure control value different from the first exposure control value based on the result of the photometry by the photometry unit, and when the dark part gradation is corrected, the image of the subject is captured according to the second exposure control value. Then, the improvement amount of lightness is calculated based on the evaluation value and the second exposure control value. Therefore, it is possible to adjust the exposure and correct the dark part gradation optimally both for the main subject portion and the background portion.

Further, according to this embodiment, there is further included a mode selecting unit selecting a shooting mode from a plurality of predetermined shooting modes, and the second photometric calculating unit calculates the second exposure control value according to a kind of the shooting mode selected by the mode selecting unit. Therefore, even a camera that is not capable of the correction by the exposure adjustment, such as a camera that is not capable of using a face detecting function prior to the shooting (a camera such as a single lens reflex camera in which an image-capturing sensor is not exposed to light prior to the shooting) or the like can optimally adjust the exposure and correct the dark part gradation.

Further, according to this embodiment, there is further included a setting unit setting photographic sensitivity used in the image capturing by the image capturing unit, and the second photometric calculating unit calculates the second exposure control value according to the photographic sensitivity set by the setting unit. Therefore, even when noise increases and a dynamic range is lacking, such as at the time of high-sensitivity shooting or the like, the optimum correction of the dark part gradation is possible.

Further, according to this embodiment, the detecting unit detects a face area of a person included in the image data, as the main subject area. Therefore, when a main subject is a person, it is possible to optimally adjust the exposure and correct the dark part gradation while emphasizing the face area.

Further, according to this embodiment, the correcting unit corrects the dark part gradation by using the blurred image generated by the generating unit. Therefore, it is possible to perform a series of the processes by effectively utilizing the generated blurred image.

Further, according to this embodiment, there is included a mode selecting unit selecting a shooting mode from a plurality of predetermined shooting modes, and whether or not to execute the calculation of the improvement amount of lightness and the correction by the correcting unit is selected according to a kind of the shooting mode selected by the mode selecting unit. Therefore, it is possible to surely correct the dark part gradation only when the correction of the dark part gradation is useful.

This embodiment shows the example where the face detection in the generated image (Step S4 in FIG. 4) comes after the shooting, but it should be noted that the present invention is not limited to this example. For example, in a camera capturing what is called a through image for composition confirmation prior to the actual shooting, the face detection may be performed in this through image and the result thereof may be used for the photometric calculation and so on.

Further, this embodiment shows the example where the improvement amount of lightness candidate fup dependent on the lightness Y of the face and the improvement amount of lightness candidate Hup dependent on the highlight recovery amount HiRcv are compared, and a larger value is set as the improvement amount of lightness Gup dependent on the highlight recovery amount HiRcv, but the present invention is not limited to this example. For example, by calculating only the improvement amount of lightness candidate fup dependent on the lightness Yf, this value may be set as the improvement amount of lightness Gup. Incidentally, when the improvement amount of lightness candidate fup dependent on the lightness Y of the face is set as the improvement amount of lightness Gup, it is preferable to set an upper limit value and a lower limit value appropriately.

Further, this embodiment shows the example where the face area of a person included in the subject is used as the main subject area, but the present invention is not limited to this example. For example, as in the publicly known art, by extracting a main subject, the whole person including a body portion and so on may be set as the main subject area. Further, by detecting a focus area based on a focus adjustment information, this area may be set as the main subject area. Further, a structure where a user designates the main subject area may be adopted.

Further, in the description of this embodiment, the 24-split photometry sensor shown in FIG. 2 is taken as an example of the photometry sensor 12, but the present invention is not limited to this example. For example, the fixed number of division may be used, though the above-described embodiment shows the example where the number of division is changed between 24 and 15. Further, the above-described embodiment shows the example where the area is equally divided, but the area may be divided unequally. For example, by dividing the vicinity of the center into relatively narrow areas and dividing the vicinity of the periphery into relatively wide areas, it is possible to enhance sensitivity regarding the center portion.

Further, this embodiment describes the example where the art of the present invention is realized in the electronic camera 1. However, the present invention is not limited to this. For example, the present invention is similarly applicable to a compact-type electronic camera, a movie camera capturing moving images, and the like.

Further, the image processing described in this embodiment may be realized as software by a computer and an image processing program. This image processing program may be one recorded in a medium or may be one recorded in a server on the Internet and downloadable via the Internet. In this case, part or all of the processes in the flowcharts described in this embodiment may be realized by the computer. For the realization by the computer, information on whether the current mode is the gradation compression mode or not and information indicating the kind of the shooting mode set at the time of image capturing, ISO sensitivity, and a gradation compression amount, and so on are supplied together with the image data to the computer. Such pieces of the information can be supplied by utilizing EXIF information or the like of the image data. Such structure makes it possible to execute the same processes as those of the above-described embodiment.

The many features and advantages of the embodiment are apparent from the detailed specification and, thus, it is intended by the appended claims to cover all such features and advantages of the embodiment that fall within the true spirit and scope thereof. Further, since numerous modifications and changes will readily occur to those skilled in the art, it is not desired to limit the inventive embodiment to the exact construction and operation illustrated and described, and accordingly all suitable modifications and equivalents may be resorted to, falling within the scope thereof.

What is claimed is:

1. An image capturing apparatus comprising: an image capturing unit capturing an image of a subject to generate image data; a generating unit generating a blurred image from the image data; a detecting unit detecting a main subject area included in the image data; a calculating unit calculating an evaluation value regarding a brightness based on an image of the main subject area among the blurred image, and calculating an improvement amount of lightness used for performing a correction on dark part gradation of the image data generated by the image capturing unit based on the evaluation value being calculated; a photometry unit performing a photometry by dividing the subject into a plurality of areas; a first photometric calculating unit calculating a first exposure control value based on a result of the photometry by the photometry unit; and a second photometric calculating unit calculating a second exposure control value different from the first exposure control value based on the result of the photometry by the photometry unit, wherein: the image capturing unit captures the image of the subject according to the second exposure control value when performing the correction on the dark part gradation; and the calculating unit calculates the improvement amount of lightness based on the evaluation value and the second exposure control value.

2. The image capturing apparatus according to claim 1, wherein
the second photometric calculating unit compares the first exposure control value and a maximum value of photometric values in the plurality of areas, and corrects the first exposure control value and calculates the second exposure control value according to a result of the comparison.

3. The image capturing apparatus according to claim 1, further comprising
a mode selecting unit selecting a shooting mode from a plurality of predetermined shooting modes, wherein
the second photometric calculating unit calculates the second exposure control value corresponding to a kind of the shooting mode selected by the mode selecting unit.

4. The image capturing apparatus according to claim 1, further comprising
a setting unit setting a photographic sensitivity during the capturing of the image by the image capturing unit, wherein
the second photometric calculating unit calculates the second exposure control value corresponding to the photographic sensitivity set by the setting unit.

5. The image capturing apparatus according to claim 1, wherein
the detecting unit detects a face area of a person included in the image data as the main subject area.

6. The image capturing apparatus according to claim 5, wherein:
when the detecting unit detects a plurality of face areas, the calculating unit calculates the evaluation value based on an image having a largest face area among the face areas.

7. The image capturing apparatus according to claim 5, wherein:
when the detecting unit detects a plurality of face areas, the calculating unit calculates the evaluation value based on an image having a darkest face area among the face areas.

8. The image capturing apparatus according to claim 5, wherein:
when the detecting unit detects a plurality of face areas, the calculating unit calculates the evaluation value for each of the face areas, and calculates the improvement amount of lightness based on a result of a weighted addition of the evaluation value being calculated for each of the face areas.

9. The image capturing apparatus according to claim 1, further comprising:
a correcting unit performing the correction to improve a lightness of the dark part gradation of the image data generated by the image capturing unit according to the improvement amount of lightness calculated by the calculating unit; and
a recording unit recording the image data corrected by the correcting unit.

10. The image capturing apparatus according to claim 9, wherein
the correcting unit performs the correction on the dark part gradation by using the blurred image generated by the generating unit.

11. The image capturing apparatus according to claim 9, further comprising:
a mode selecting unit selecting a shooting mode from a plurality of predetermined shooting modes; and
a controlling unit selecting whether or not to calculate the improvement amount of lightness by the calculating unit and to perform the correction by the correcting unit according to a kind of the shooting mode selected by the mode selecting unit.

12. A storage medium storing an image processing program for causing a computer to execute image processing to image data being a processing target, the image processing program comprising: an obtaining step obtaining the image data; a generating step generating a blurred image from the image data; a detecting step detecting a main subject area included in the image data; a calculating step calculating an evaluation value regarding a brightness based on an image of the main subject area among the blurred image, and calculating an improvement amount of lightness used for performing a correction on dark part gradation of the image data obtained in the obtaining step based on the evaluation value being calculated; a photometry step performing a photometry by dividing the subject into a plurality of areas; a first photometric calculating step calculating a first exposure control value based on a result of the photometry by the photometry unit; and a second photometric calculating step calculating a second exposure control value different from the first exposure control value based on the result of the photometry in the photometry step, wherein: the obtaining step obtains the image of the subject according to the second exposure control value when performing the correction on the dark part gradation; and the calculating step calculates the improvement amount of lightness based on the evaluation value and the second exposure control value.

* * * * *